United States Patent Office 3,351,661
Patented Nov. 7, 1967

3,351,661
DICYCLOHEXYLAMINE
Frederik H. Van Munster, Waukegan, Ill., assignor to Abbott Laboratories, Chicago, Ill., a corporation of Illinois
No Drawing. Filed June 2, 1964, Ser. No. 372,097
5 Claims. (Cl. 260—563)

The present application relates to the manufacture of dicyclohexylamine. More particularly, it relates to the preparation of dicyclohexylamine from phenol and ammonia.

Dicyclohexylamine has been commercially produced in the past by high-temperature/high-pressure catalytic reductions from aniline. With increasing demands for dicyclohexylamine, particularly as a rubber accelerator or vapor phase corrosion inhibitor, alternate routes for economically producing dicyclohexylamine from inexpensive starting materials are therefore of great commercial interest.

It is thus an object of the present invention to provide a new and improved process for the manufacture of dicyclohexylamine. Another object of the present invention is the commercial production of dicyclohexylamine from inexpensive starting materials. It is a particular object to provide a method for the manufacture of dicyclohexylamine from phenol. A further object is a provision of a simple process for making dicyclohexylamine in good yields under mild conditions. A still further object of this invention is the economical production of dicyclohexylamine.

These and other objects are accomplished by hydrogenating a mixture of ammonia and phenol in a molar ratio between 1:1 and 1:2 in the presence of at least 0.02% by weight of palladium at a hydrogen pressure of at least 15 p.s.i.g. and at a temperature between 70° and 150° C.

In a simple embodiment of the present invention two moles of phenol and one mole of anhydrous ammonia are hydrogenated in the presence of 20 grams of 5% palladium-on-carbon catalyst in a Parr shaker. The hydrogen pressure is kept between 15 and 150 p.s.i.g. and the temperature is kept between 70° and 150° C. When the calculated amount of hydrogen is absorbed by the mixture, the reaction stops and the catalyst is filtered off. The filtrate can be worked up by conventional means such as fractionation but, surprisingly, it is found that after eliminating the low-boiling components of the filtrate, the remaining undistilled portion represents dicyclohexylamine pure enough for most purposes. However, since occasionally some unreacted phenol may be found in the undistilled residue, it is recommended that an excess of ammonia be used in this reaction, or, that the forerun of the distillation be permitted to go as high as 190° under atmospheric pressure. By using the latter alternative, unreacted phenol and the low-boiling by-products such as water, cyclohexylamine, cyclohexanol and cyclohexanone are all eliminated, so that the undistilled residue contains only the desired dicyclohexylamine and very small amounts of N-phenylcyclohexylimine and N-cyclohexylcyclohexylimine.

To better understand the present invention, reference is made to the following illustrative examples which are not intended to limit the invention. In these examples as well as in the discussion following, all percentages given are percents by weight.

EXAMPLE 1

A mixture of 23.6 grams of phenol and 2 grams of 5% palladium on charcoal (0.4% by weight of palladium) in a Parr shaker is treated with a 3:1 mixture of hydrogen and ammonia at a temperature range between 78° and 99° C. The pressure is maintained between 40 and 60 p.s.i.g. After 6.5 hours of amination/hydrogenation, no more gas mixture is absorbed and the reaction is interrupted. The mixture is filtered and the filtrate analyzed by gas chromatography showing 21.4% cyclohexylamine, 9.8% unreacted phenol, 67.0% dicyclohexylamine (a yield of 74.3% of theory), 0.5% N-cyclohexylcyclohexylimine, and 1.1% N-phenylcyclohexylimine. When stripping this filtrate of the low-boiling components, the residue contains the dicyclo in a purity of 97.7%.

When, in this example, the catalyst used is replaced by 2 grams of 5% rhodium on charcoal, 0.1% of low-boiling components, 72.2% cyclohexylamine, 10.2% cyclohexanol, and only 17.5% of dicyclohexylamine is obtained, at a reaction time of 4 hours.

EXAMPLE 2

A mixture of 94.1 grams of phenol, 8.5 grams of anhydrous ammonia, and 10 grams of 5% palladium on charcoal (0.5% by weight of palladium) in a 500-ml. Parr shaker is hydrogenated after the usual purging with hydrogen gas at a hydrogen pressure between 29 and 63 p.s.i.g. and at a temperature between 84° and 103° C. After 6 hours, the calculated amount of hydrogen is absorbed and the reaction mixture is filtered. Analysis of the filtrate shows 4.4% of low-boiling components, 90.6% of dicyclohexylamine, and 4.9% of N-phenylcyclohexylimine.

EXAMPLE 3

A mixture of 941 grams (10 moles) of phenol and 90 grams of 5% palladium on charcoal (0.5% by weight of palladium) is placed in a one-gallon autoclave and the air above the mixture is purged with nitrogen. The mixture is heated to about 45° C. and thoroughly mixed. A cylinder containing 85 grams (5 moles) of ammonia and a hydrogen line are connected to the autoclave. The hydrogen is forced into the autoclave with a pressure of about 150 p.s.i.g. and mixed with the other reactants. A thermostat set at 90° C. is used for the autoclave to maintain a minimum temperature of 90° during the reaction, although at the onset of the reaction, the reaction heat warms up the mixture to about 110° C. After 5½ hours, the reaction is terminated and the mixture is filtered. The filtrate shows two layers. The top layer and wash liquor (ethanol) is fractionated and produces 773 grams of a fraction boiling at 238–260° C. Gas chromatographic analysis of this fraction shows it to consist of 0.8% of a mixture of cyclohexylamine, cyclohexanone and cyclohexanol, 1.0% of unreacted phenol, 94.9% of dicyclohexylamine, and 3.3% of N-phenylcyclohexylimine. This represents a yield of 82.5% of dicyclohexylamine in this layer. The abovementioned bottom layer of 84 grams contains an additional amount of recoverable dicyclohexylamine.

It will be seen from the above examples that the use of palladium as the catalyst for the present process is unique, in that other noble metal catalysts will produce a preponderance of the primary amine. Noble metal catalysts other than the rhodium shown above as a comparison will produce only low yields of dicyclohexylamine, accompanied by much higher by-product formation. The palladium catalyst used in the process of the present invention may be supported by charcoal, alumina, kieselguhr, asbestos, bentonite, or other conventional carriers. The catalyst may also be unsupported and is then preferably in a finely divided form but not colloidal, because when using colloidal catalyst particles, elimination of such particles is much more difficult and requires special equipment or the aid of flocculating agents which in turn have to be eliminated from the filtrate.

The amount of catalyst used is of relatively low importance as long as a minimum of about 0.02% by weight based on the phenol is used. With larger catalyst amounts, the reaction proceeds considerably faster but no advantage is seen in using more than about 2% of metallic palladium. Although the process of this invention produces satisfactory results when introducing the hydrogen or hydrogen/ammonia mixture at atmospheric pressure, higher pressures may be used. It is, however, an important aspect of the present invention that the process can be carried out at pressures requiring only standard low-pressure equipment such as Parr shakers, stirred tank reactors, stills, and the like. The above temperature limitation sets out the most economical range although the reaction will also proceed below 70° C. and above 150°. When operating below 70° C., absorption of hydrogen or hydrogen/ammonia is slow, particularly when using a catalyst ratio close to the minimum shown above. On the other hand, when temperatures above 150° C. are used, by-product formation increases.

From the equation of the present invention, it will be noted that 2 moles of phenol are consumed per mole of ammonia. However, such a ratio does not have to be used in the present reaction. It was found that excellent results are obtained by using a ratio of phenol to ammonia between 1:1 and 2:1 moles.

The ammonia required may be premixed with the phenol or it may be premixed with the hydrogen before being introduced into the reaction vessel. When premixing ammonia with hydrogen, a mole ratio between 1:4 and 1:6 is desirable. The ammonia may also be used as an aqueous solution since water so introduced has no major adverse effect on the reaction.

Others may practice the invention in any of the numerous ways which will be obvious to one skilled in the art from the present disclosure. All such practice of the invention is considered a part hereof provided it falls within the scope of the appended claims.

I claim:
1. The process of preparing dicyclohexylamine consisting essentially of the step of reacting phenol with ammonia and hydrogen at a pressure above 15 p.s.i.g. and at a temperature between 70° and 150° in the presence of at least 0.02% of catalytic metallic palladium by weight based on the amount of phenol, whereby said phenol, ammonia and hydrogen are introduced into the reaction vessel substantially at a molar ratio between 2:1:6 and 1:1:4.
2. The process of claim 1 wherein said pressure is between 15 and 150 p.s.i.
3. The process of claim 1 wherein said hydrogen and said ammonia are premixed as gases in a ratio of between 4:1 and 6:1.
4. The process of claim 1 wherein said amount of palladium is between 0.02% and 2.0% by weight based on the amount of phenol.
5. The process of claim 4 wherein said palladium is supported by a charcoal carrier.

References Cited
UNITED STATES PATENTS

| | | | |
|---|---|---|---|
| 1,982,985 | 12/1934 | Ernst et al. | 260—563 |
| 2,571,016 | 10/1951 | Dankert et al. | 260—563 |

CHARLES B. PARKER, *Primary Examiner.*

N. WICZER, P. IVES, *Assistant Examiners.*